United States Patent [19]
Rosenthal

[11] Patent Number: 5,405,631
[45] Date of Patent: Apr. 11, 1995

[54] APPARATUS AND METHOD FOR SANITIZING FRUITS

[76] Inventor: Richard Rosenthal, P.O. Box 329, Fawnskin, Calif. 92333

[21] Appl. No.: 200,508

[22] Filed: Feb. 23, 1994

[51] Int. Cl.⁶ ............................ A23B 7/00; A23L 3/00
[52] U.S. Cl. .................................. 426/235; 99/451; 99/485; 99/536; 426/241; 426/248; 426/506
[58] Field of Search ............... 426/235, 241, 248, 320, 426/506, 532; 99/451, 477, 485, 536; 422/24, 28

[56] References Cited

U.S. PATENT DOCUMENTS

| | | | |
|---|---|---|---|
| 3,447,544 | 6/1969 | DeVergara | 99/536 |
| 4,549,477 | 10/1985 | McCabe, Jr. | 99/477 |
| 4,592,892 | 6/1986 | Ueno et al. | 422/28 |
| 4,598,082 | 11/1986 | Bailey | 514/352 |
| 4,839,372 | 6/1989 | Bailey | 514/352 |
| 4,865,857 | 9/1989 | Inagaki | 426/241 |
| 4,867,052 | 9/1989 | Cipelletti | 99/451 |
| 4,875,407 | 10/1989 | Inagaki | 99/451 |
| 4,974,503 | 12/1990 | Koch | 99/451 |
| 5,011,699 | 4/1991 | Mitsuda et al. | 426/320 |

Primary Examiner—George Yeung
Attorney, Agent, or Firm—Walter A. Hackler

[57] ABSTRACT

Apparatus and method are provided for sanitizing citrus fruit which includes an ultraviolet radiation station for both irradiating of fruit with ultraviolet light and generating ozone. An infrared radiation station is provided for irradiating the ultraviolet light irradiated fruit with infrared light and an ozone tank is utilized for exposing the ultraviolet light and infrared light irradiated fruit to a mixture of water and ozone. The ozone generated at the ultraviolet radiation station is collected and thereafter introduced into the ozone tank.

21 Claims, 1 Drawing Sheet

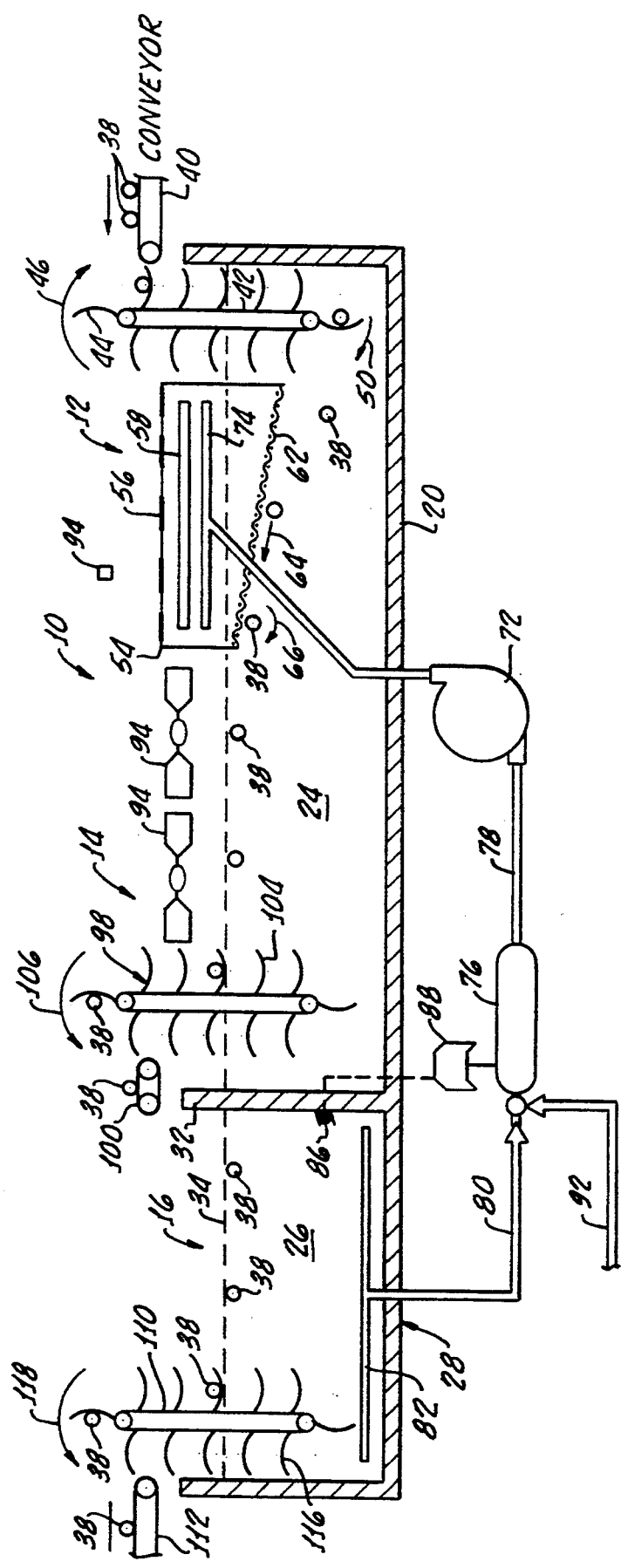

APPARATUS AND METHOD FOR SANITIZING FRUITS

The present invention generally relates to a sterilizing method for treating of fresh fruits and an apparatus used for the method. More particularly, the present invention is directed to a chemical-free, sanitizer for use in eliminating bacteriological pathogens, commonly found to infect citrus fruits during the post-harvest cycle in citrus packing houses.

As is typical, in the distribution of food products, fruit is processed in great quantities in certain specified areas and transported to diverse centers for consumption. Consequently, a period of time lapses for transportation of the fruit and, during such time, spoilage may occur by bacteriological or fungicidal infection of the fruit.

For example, fungicidal infection of oranges, lemons and grapefruits may occur by penicillum digitatum, italicum and/or geotrichum, candidum.

Currently, citrus fruits are impregnated with chemical fungicides such as sodium o-phenylphenate, thiabendazole and imazalil. Unfortunately, the use of such fungicides may also cause harmful effects to the environment, and individuals. In addition, the use of such chemical treatments is not only expensive, but the use thereof may be inhibited by governmental agencies due to the recognized toxicity thereof.

Other sterilization methods utilized have included gamma radiation; however, low dosages of gamma radiation are known to only partially inactivate the pathogenic organisms. It is unfortunate in that the required dosage of gamma radiation necessary to kill these organisms, it has been found to produce discoloration of the peel, which may result in softening of citrus fruits. In addition, only minimal increases in the storage shelf life are provided by gamma radiation due to secondary physiological changes in the radiated fruits, predisposing them to secondary decay.

Other processing equipment has utilized ozone gas, relying on its strong oxidizing potential of more than twice that of chlorine at approximately 3 times that of hydrogen peroxide, Further, ozone has the advantage of breaking down upon use as an oxident, into oxygen, which is normally beneficial.

Ultraviolet light may be used for sanitation purposes; however, UV radiation induces DNA damage which results in the formation of pyrimidine dimers that Obstruct further cellular replication if these dimers remain in the cell citrus fruits.

The present invention provides for a unique apparatus and method in which ultraviolet light is used to both sanitize fruit and produce ozone. Subsequent infrared radiation of the fruit is used to provide photoreactivation or photorepair of UV-induced DNA damage and the ozone produced is utilized for oxidizing the remaining fungicidal infection remaining in the peel, or flavado, of the fruit. Naturally, the by-products of the present method are carbon dioxide, carbon monoxide and water vapor, all of which provide no significant environmental problems.

SUMMARY OF THE INVENTION

Apparatus in accordance with the present invention for sanitizing fruit generally includes an ultraviolet radiation station having means for both irradiating fruit with ultraviolet light and simultaneously generating ozone.

An infrared radiation station is provided which includes means for radiating the ultraviolet light irradiated fruit with infrared light. As hereinabove noted; such infrared irradiation is used to provide photoreactivation or photorepair of UV induced DNA damage.

An ozone tank provides means for exposing the ultraviolet light and infrared light irradiated fruit to a mixture of water and ozone.

Means are also provided for collecting the ozone generated at the ultraviolet radiation station and, further, means are provided for introducing the-collected ozone into the ozone tank.

More particularly, apparatus in accordance with the present invention includes means for submerging the fruit and water for ultraviolet irradiation thereof at the ultraviolet radiation station. In addition, means are provided for moving and rotating the fruit at the ultraviolet radiation station in order to enhance uniformity of radiation on the surface of the fruit.

Preferably, the means for moving and rotating the fruit comprises an inclined floatation screen disposed at the ultraviolet radiation station.

In order to enhance ozone production, the means for both irradiating citrus fruit with ultraviolet light in generating ozone may comprise ultraviolet light emitting bulbs and an absorption screen comprising ammonium hexachloroplatinate.

More specifically, the apparatus in accordance with the present invention may include a rinse tank which encompasses both the ultraviolet radiation station and the infrared radiation station. In addition, water in the rinse tank provides a means for moving the ultraviolet light irradiated fruit from the ultraviolet radiation station to the infrared radiation station.

More particularly, the rinse tank and the ozone tank may comprise separate cells in a unitary tank.

A method in accordance with the present invention for sanitizing citrus fruit comprises the steps of exposing citrus fruit to ultraviolet radiation at an ultraviolet ozone-generating station and thereafter, exposing the ultraviolet exposed citrus fruit to infrared radiation.

Ozone generated at the ultraviolet ozone-generating station is mixed with water and the ultraviolet and infrared exposed citrus fruit is submerged in the mixture of ozone and water.

BRIEF DESCRIPTION OF THE DRAWINGS

The advantages and features of the present invention will be better understood by the following description, when considered in conjunction with the accompanying drawings, in which:

FIG. 1 is a schematic/flow diagram of the apparatus in accordance with the present invention also illustrating the method of the present invention.

DETAILED DESCRIPTION

Turning now to FIG. 1, there is generally shown apparatus 10 for sanitizing fruit, particularly citrus fruit, which generally includes an ultraviolet radiation station 12, an infrared radiation station 14, and an ozone tank 16.

The UV station 12 and the IR station 14 are both disposed at a rinse tank 20, which may be separated from the ozone tank 16 but, preferably, as shown in FIG. 1, the rinse tank 20 and the ozone tank 16 form cells 24, 26 in a unitary tank 28, with the cells 24, 26 being separated by a tank wall 32. The tank 28 size will, of course, be dependent upon the expected throughput of fruit therethrough; however, it is expected that a tank having an overall length of about 7 feet will be able to handle 3000 pounds of citrus fruit per hour.

Accordingly, the apparatus 10 and all the components thereof are sized for the same amount of fruit through put. The tank 28 may be constructed of any suitable material for both supporting the weight of water and fruit therein and provide a sterile environment for the fruit.

Both the ozone tank 16 and the rinse tank 20 are filled with water as indicated by a fill line 34 in FIG. 1. Fruit 38 is delivered to the tank by a conventional conveyor system 40 and immersed in the rinse tank 20 by means of a conventional conveyor paddle system 42, including paddles 44 rotating in the direction of arrow 46 in order to submerge the fruit 38 into the rinse tank 20 and move the fruit in the direction of arrow 50 to the UV station 12.

The UV station 12 includes an enclosure housing ultraviolet ozone producing lamps 56, commercially available, operating at a spectral emissivity of 254 nanometers. An intense ultraviolet energy source generating 44,000 micro-watt-sec/cm2 provides for a 90 percent kill of penicillum digitatum and geotrichum candidum. A grid comprising ammonium hexachloroplatinate enhances ozone production by the UV lamps. The ammonium hexachloroplatinate is formed into a grid, allowing UV to pass therethrough and on to fruit 38 beneath a teflon mesh flotation screen 62.

By disposing the flotation screen at approximately a 5° angle to the horizontal, there is provided a means for moving the fruit 38 through the ultraviolet radiation station 12 in the direction of arrow 64. This movement is facilitated by the buoyancy of the fruit 38, which is a combination with the angled flotation screen, also causes rotation as shown by the arrow 66 of the fruit 38.

Thereafter, the water in the rinse tank 20 provides a means for moving the ultraviolet light irradiated citrus fruit from the ultraviolet radiation station 12 to the IR radiation station 14.

The enclosure 54 includes air vents 70. How ever, the enclosure 54 forms an air tight seal with surrounding water which prevents ozone gas from the enclosure 54 from escaping to this rounding atmosphere.

A chemically inert compressor 72, withdraws ozone via a manifold 74 and discharges the compressed ozone into a tank 76 via a discharge line 78. Thereafter, the ozone is introduced into the ozone tank 16 via line 80 and manifold 82, with the ozone concentration in the water of the ozone tank 16 being monitored by a conventional sensor 86 which controls the flow of ozone through a control system 88. If the ozone concentration in the ozone tank 16 is too high, the excess gas is vented to the atmosphere through line 92 via the control valve system 88. All of these controls and sensors are conventional devices.

In addition, an ozone sensor 94 is provided adjacent the UV station 12 in order to monitor the surrounding air in the vicinity of the UV station 12. If the concentration in the air above the UV station 12 exceeds 0.1 ppm, the UV lamps 56 are immediately shut off through an automatic control system, not shown.

Turning again to the operation of the rinse tank, after the fruit has cleared the flotation screen 62, it is subjected to infrared radiation at the IR station 14.

Conventional infrared lamps 94, such as Quartz Halogen are disposed over the rinse tank 20 at the IR station 14 in order to provide photoreactivation to the fruit, which results in the formation of pyrimidine dimers that obstructs further cellular replication that these dimers remain in the cells of the citrus fruit.

It has been found that 500 Watt IR lamps sufficiently provide the required photoreactivation.

A paddle system 98 and conveyor 100 provide means for moving the ultraviolet light and infrared light irradiated citrus fruit from the infrared radiation station 14 to the ozone tank 16. The paddle system 98 and conveyor 100 are conventional devices, with the paddle system 98 including paddles 104 rotating in the direction of arrow 106 in order to lift the fruit 38 from the rinse tank 20 and on to the conveyor 100 for submerging in the ozone tank 16.

Preferably the ozone concentration in the ozone tank 16 is regulated to about 0.66 parts per million, which is of sufficient concentration to effectively oxidize the remaining fungicidal infection, or spores, remaining in the flavado of the fruit.

The fruit 38 is removed from the ozone tank 16 by means of a paddle system 110 and conveyor 112, which are of conventional design. Paddles 116 elevate the fruit 38 from the tank when rotated in the direction of arrow 118 for delivering the fruit 38 to the conveyor 112 for packaging thereof.

The apparatus 10 is useful for effecting the method of the present invention which generally includes the steps of exposing citrus fruit to ultraviolet radiation at an ultraviolet ozone generating station, exposing the ultraviolet exposed citrus fruit to infrared radiation, fixing ozone generated at the ultraviolet ozone generating station with water and submerging the ultraviolet and infrared exposed citrus fruit to the mixture of ozone and water.

Although there has been described hereinabove a specific apparatus and method for sanitizing fruit in accordance with the present invention for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention as defined in the appended claims.

What is claimed is:

1. Apparatus for sanitizing citrus fruit comprising:
   an ultraviolet radiation station having means for both irradiating citrus fruit with ultraviolet light and generating ozone;
   an infrared radiation station having means for irradiating the ultraviolet light irradiated citrus fruit with infrared light;
   means for moving the ultraviolet light irradiated citrus fruit from the ultraviolet radiation station to the infrared radiation station;
   ozone tank means for exposing the ultraviolet light and infrared light irradiated citrus fruit to a mixture of water and ozone;
   means for moving the ultraviolet light and infrared light irradiated citrus fruit from the infrared radiation station to the ozone tank means;
   means for collecting the ozone generated at the ultraviolet radiation station; and
   means for introduction of the collected ozone into the ozone tank means.

2. The apparatus according to claim 1 further comprising means for submerging the citrus fruit in water for ultraviolet irradiation thereof at the ultraviolet radiation station.

3. The apparatus according to claim 2 further comprising means for moving the citrus fruit though the ultraviolet radiation station.

4. The apparatus according to claim 3 wherein the means for moving the citrus fruit through the ultraviolet radiation station comprises a floatation screen.

5. The apparatus according to claim 2 further comprising means for causing rotation of the citrus fruit during ultraviolet irradiation at the ultraviolet radiation station.

6. The apparatus according to claim 5 wherein the means for causing rotation of the citrus fruit comprises a floatation screen.

7. The apparatus according to claim 1 wherein the means for both irradiation of the citrus fruit with ultraviolet light and generating ozone comprises ultraviolet light emitting bulbs and an adsorption screen comprising ammonium hexachloroplatinate.

8. The apparatus according to claim 3 wherein the ultraviolet radiation station and the infrared radiation station are both disposed in a rinse tank and the means for moving the ultraviolet light irradiated citrus fruit from the ultraviolet radiation station and the infrared radiation station comprises water.

9. The apparatus according to claim 8 wherein the rinse tank and the ozone tank means comprise separated cells in a unitary tank.

10. Apparatus for sanitizing fruit comprising:
a water rinse tank;
means for introducing fruit into the water rinse tank;
means for removing fruit from the water rinse tank, said means for removing fruit and means for introducing fruit being spaced apart from one another;
ultraviolet means for both irradiating the fruit with ultraviolet light and generating ozone, said ultraviolet means being disposed between the means for introducing fruit and the means for removing fruit;
infrared means for irradiating the ultraviolet light irradiated fruit with infrared light, said infrared means being disposed between the ultraviolet means and the means for removing fruit;
ozone tank means for exposing the ultraviolet light and infrared irradiated fruit to a mixture of water and ozone;
means for moving the ultraviolet light and infrared light irradiated fruit from the water rinse tank to the ozone tank means;
means for collecting the generated ozone; and
means for introducing the collected ozone into the ozone tank means.

11. The apparatus according to claim 10 further comprising means for submerging the fruit in water for ultraviolet irradiation thereof.

12. The apparatus according to claim 11 further comprising means for moving the fruit during ultraviolet irradiation.

13. The apparatus according to claim 12 wherein the means for moving the fruit during ultraviolet irradiation comprises a floatation screen.

14. The apparatus according to claim 11 further comprising means for causing rotation of the fruit during ultraviolet irradiation.

15. The apparatus according to claim 14 wherein the means for causing rotation of the fruit comprises a floatation screen.

16. The apparatus according to claim 10 wherein the means for both irradiating fruit with ultraviolet light and generating ozone comprises ultraviolet light emitting bulbs and an adsorption screen comprising ammonium hexachloroplatinate.

17. The apparatus according to claim 11 wherein the water rinse tank and the ozone tank means comprise separated cells in a unitary tank.

18. A method for sanitizing citrus fruit comprising the steps of:
exposing citrus fruit to ultraviolet radiation at an ultraviolet and ozone generating station;
exposing the ultraviolet exposed citrus fruit to infrared radiation;
mixing ozone generated at the ultraviolet and ozone generating station with water; and
submerging the ultraviolet and infrared exposed citrus fruit in the mixture of ozone and water.

19. The method according to claim 18, further comprising the step of submerging the citrus fruit during exposure to the ultraviolet radiation.

20. The method according to claim 19, further comprising the step of moving the submerged citrus fruit during exposure to the ultraviolet radiation.

21. A method for sanitizing citrus fruit comprising the steps of:
exposing citrus fruit to ultraviolet radiation;
exposing the ultraviolet exposed citrus fruit to infrared radiation; and
submerging the ultraviolet and infrared exposed citrus fruit in a mixture of ozone and water.

* * * * *